United States Patent
Hu et al.

(10) Patent No.: US 8,964,647 B2
(45) Date of Patent: *Feb. 24, 2015

(54) ARCHITECTURAL MODEL FOR LTE (LONG TERM EVOLUTION) EPC (EVOLVED PACKET CORE) DEPLOYMENT

(71) Applicant: AT&T Mobility II LLC, Atlanta, GA (US)

(72) Inventors: Qingmin James Hu, Sammamish, WA (US); Douglas Eng, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,050

(22) Filed: Sep. 20, 2013

(65) Prior Publication Data
US 2014/0022907 A1    Jan. 23, 2014

Related U.S. Application Data

(63) Continuation of application No. 12/402,239, filed on Mar. 11, 2009, now Pat. No. 8,565,150.

(51) Int. Cl.
| | | |
|---|---|---|
| *H04W 4/00* | (2009.01) | |
| *H04B 7/00* | (2006.01) | |
| *H04W 28/02* | (2009.01) | |
| *H04W 88/16* | (2009.01) | |
| *H04W 40/00* | (2009.01) | |
| *H04W 92/02* | (2009.01) | |

(52) U.S. Cl.
CPC .......... *H04W 28/0247* (2013.01); *H04W 88/16* (2013.01); *H04W 40/00* (2013.01); *H04W 92/02* (2013.01)

USPC ........................................................ 370/328

(58) Field of Classification Search
None
See application file for complete search history.

(56) References Cited

U.S. PATENT DOCUMENTS

| | | | |
|---|---|---|---|
| 2010/0124223 A1* | 5/2010 | Gibbs et al. ................... 370/389 |
| 2010/0220656 A1* | 9/2010 | Ramankutty et al. ......... 370/328 |
| 2010/0278111 A1* | 11/2010 | Kashima et al. .............. 370/328 |
| 2010/0309881 A1* | 12/2010 | Kim et al. ..................... 370/331 |
| 2011/0122824 A1* | 5/2011 | Muhanna et al. ............. 370/328 |
| 2011/0128907 A1* | 6/2011 | Kvernvik ...................... 370/328 |
| 2012/0269162 A1* | 10/2012 | Vesterinen et al. ........... 370/331 |

OTHER PUBLICATIONS

Office Action dated Nov. 23, 2011 for U.S. Appl. No. 12/402,239, 23 pages.

(Continued)

*Primary Examiner* — Chirag Shah
*Assistant Examiner* — Srinivasa Reddivalam
(74) *Attorney, Agent, or Firm* — Amin, Turocy & Watson, LLP

(57) ABSTRACT

A new deployment model enables a seamless migration to LTE (long term evolution)/EPC (Evolved packet core). In addition, an intelligent edge gateway (IEG) supports future distributed architecture and a converged network for service providers. Specifically, the model supports existing data services (e.g. UMTS) and the delivery of LTE services does not affect the existing data services. Moreover, a distributed architecture is employed, such that, local traffic is optimally routed at the edge and backhaul is minimized. The system can also provide support for enhanced Femto cell 3GPP access to a home network.

20 Claims, 11 Drawing Sheets

(56) References Cited

OTHER PUBLICATIONS

Office Action dated Sep. 12, 2012 for U.S. Appl. No. 12/402,239, 26 pages.

Office Action dated Dec. 18, 2012 for U.S. Appl. No. 12/402,239, 31 pages.

* cited by examiner

ARCHITECTURAL MODEL FOR LTE (LONG TERM EVOLUTION) EPC (EVOLVED PACKET CORE) DEPLOYMENT

TECHNICAL FIELD

This application is a continuation of U.S. patent application Ser. No. 12/402,239 entitled "A NEW ARCHITECTURAL MODEL FOR LTE (LONG TERM EVOLUTION) EPC (EVOLVED PACKET CORE) DEPLOYMENT," filed Mar. 11, 2009. The entirety of the above noted application is incorporated by reference herein.

TECHNICAL FIELD

The subject innovation relates to wireless communications and, more particularly, to an architectural model, which provides a phased evolution path that enables migration to Evolved packet core (EPC) architecture and beyond.

BACKGROUND

Mobile data communications is evolving quickly because of global communication networks and devices such as the Internet, intranets, laptops, PDAs (personal digital assistants) and increased requirements of workforce mobility. Third generation mobile system (3G) technologies (e.g., UMTS-Universal Mobile Telecommunications System) are considered enhancements to GSM (Global System for Mobile telecommunications) cellular standards.

3GPP (Third generation partnership project) standards define an EPC (evolved packet core) that supports packet-switched traffic only. One of the main advantages of EPC is that interfaces are based on IP protocols and thus all services can be delivered through packet connections (e.g., data, voice, media, etc.). Mobile operators can employ a single-packet network for all services by utilizing the EPC. With the LTE (long term evolution) and EPC standards near completion, mobile operators are gearing up to deploy the new 3GPP standard architecture. Although the new standard EPC architecture offers many advantages, there are still many gaps in between the new architecture and the conventional deployed systems (e.g. 3G radio access networks). Furthermore, the migration path has to be carefully planned to maximize the investment yet provide seamless evolution of the mobile core network.

The core mobile data network has seen its traffic demand increase dramatically in the past few years and is expected to grow even faster. Various challenges are faced in designing a packet core network. Some of these challenges include, managing the evolution of the packet core without impact to existing data services, considering the need to separate user plane traffic and control traffic, migration from a centralized deployed architecture to a more distributed architecture and/or migration of network intelligence to the edge. In addition, deployment of EPC systems has increased cost and management complexity.

DETAILED DESCRIPTION

Figure 1:
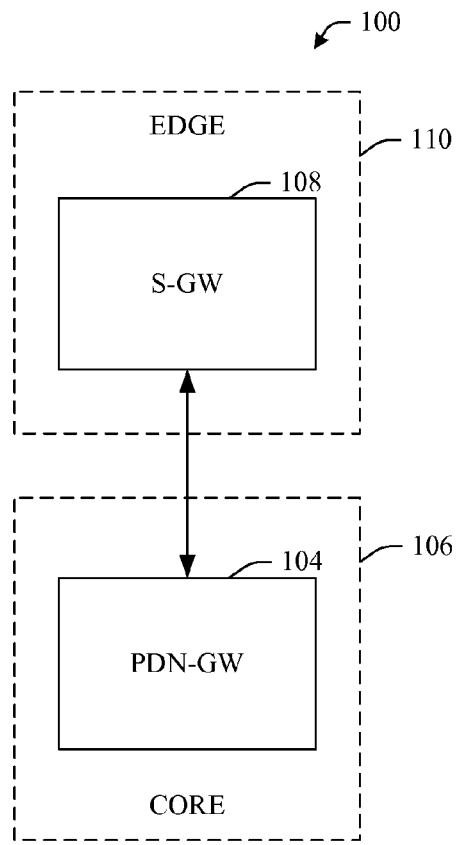
FIG. 1 illustrates high-level system diagrams depicting example system architectures for an EPC (evolved packet core) in accordance with an aspect of the subject disclosure.
Figure 1:
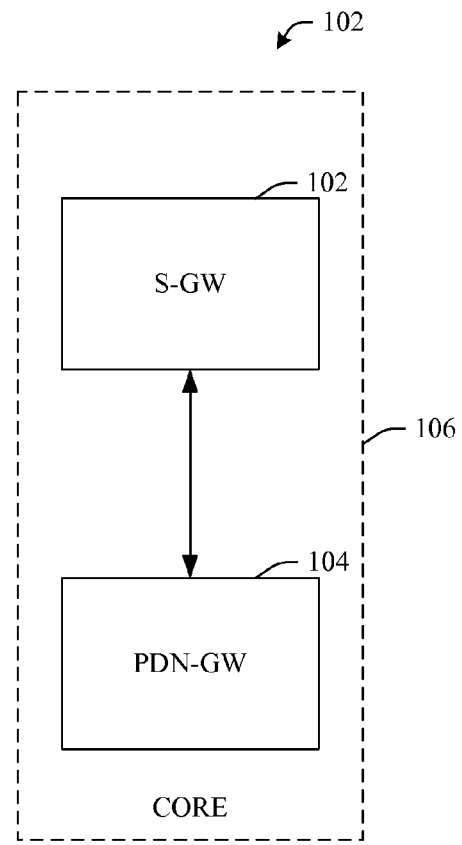

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset,", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the term "Node B," employed herein can additionally denote an "access point," "base station," "evolved Node B," "home Node B (HNB)," and the like, and refers to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber,", "operator", "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit. Further, the terms "existing services" and "existing architecture" used herein can include 2G/3G services and architectures respectively.

With telecommunication networks evolving in the direction of IP (Internet Protocol)-based services and traffic moving towards an all IP environment, the migration of network intelligence towards the "edge" of the networks via IP addressing capabilities is having a significant impact on operators' ability to manage and control their networks in terms of providing intelligent, integrated services. Systems and/or methods are presented herein that can provide a phased evolution path for a service provider to migrate existing deployment architecture to the new EPC (Evolved Packet Core) architecture and can provide a clear path to solve issues associated therewith. In addition, a network architecture model is provided, which is intelligently distributed yet provides some central management capability. It can be appreciated that the EPC standards can be the technical specification defined by the 3rd Generation Partnership Project's (3GPP's) Technical Specification Group Services and System Aspects entitled "Architecture enhancements for non-3GPP accesses, Release 8" and identified as "3GPP TS 23.402 V8.4.1 (2009-01)", which is incorporated herein by reference in its entirety.

SAE (System Architecture Evolution)/EPC is defined by 3GPP in Release 8 as a new core network with a flatter all-IP architecture, that can be utilized to enable a higher-data-rate, lower-latency packet-optimized system that supports multiple radio-access technologies. The SAE/EPC supports most any services (including voice) in a packet-switched domain. Specifically, the SAE/EPC can support the EUTRAN (Evolved UMTS Terrestrial Radio Access Network), which utilizes an OFDMA (orthogonal frequency division multiple access) based air interface as defined by the 3GPP standards. Moreover, the complete packet system consisting of the EUTRAN and the EPC is called the Evolved Packet System (EPS). The combination of LTE and SAE provides an all-IP, packet only wideband OFDMA system that can improve performance by providing higher data rates, improved spectral efficiency and reduced latency.

In one aspect, the EPS architecture can include only two nodes in the user plane, namely, a base station and a core network Gateway (GW). Typically, a node that performs control-plane functionality (MME—Mobility Management Entity) can be separated from a node that performs bearer-plane functionality (GW), with a well-defined open interface between them (S11), and by using the optional interface S5 the Gateway (GW) can be split into two separate nodes. Thus, throughput traffic and control signal processing can be independently scaled. FIGS. 1-4 provide an example network architecture that optimizes topological locations of nodes within the network in order to optimize the network in different aspects.

The systems and methods disclosed herein, in one aspect thereof, can facilitate realistic phased architectural evolution of a deployed network (e.g. 3G radio access network). The system facilitates reduced latency and higher data performance through a flatter all-IP architecture and provides support for both LTE radio-access networks and interworking 3G radio-access networks. In one aspect, a PDN-GW (Packet Data Network Gateway) is deployed at a core, for example, a NDC (National Data Center) and an S-GW (Serving Gateway) is deployed at an edge, for example a RDC (Regional Data Center), in a manner such that existing services, for example, provided by 3G radio-access networks are not affected.

According to another aspect, a network architecture is provided wherein a PDN-GW and S-GW can be deployed together at the core (e.g. NDC) during an initial migration deployment. Moreover, deploying the S-GW at the core can reduce costs and management complexity of the system. Further, the existing services, for example, provided by 3G radio-access networks can be delivered with zero or minimal impact.

In accordance with another aspect, a hybrid architecture is utilized for migrating to LTE/EPC standards, wherein an edge PDN-GW and S-GW are deployed together at an edge and a core PDN-GW is deployed at the core. Specifically, the edge PDN-GW and core PDN-GW are deployed in a hierarchical manner. The deployment provides a faster response time for real time traffic and local management and/or routing of services at the edge.

Yet another aspect of the disclosed subject matter relates to a long term evolution mobile core architecture that can meet the long term need of a converged network and that is inline with long term 3GPP standardization. Specifically, the architecture is distributed, such that, control plane elements are less distributed and user plane elements are distributed at an edge. More specifically, an intelligent edge gateway (IEG) is deployed at the edge. In one example, the IEG can intelligently route traffic at the edge, such that response time and performance is improved.

An additional aspect of the subject disclosure relates to a method that facilitates migration towards a LTE/EPC with minimal impact on existing services. In one example, a PDN-GW can be utilized at the core and an S-GW can be utilized at the edge. In another example, a PDN-GW and an S-GW can be utilized together at the core and can provide centralized management. In yet another example, a PDN-GW can be utilized at the core, along with, a PDN-GW and an S-GW that can be utilized together at the edge. LTE services can be established by employing the PDN-GW(s) and S-GW, without affecting the existing (e.g. UMTS) services. Further, in one aspect, control plane elements can be less distributed and user plane elements can be distributed at the edge. Specifically, an IEG that supports mobility and distributed architecture can be utilized at the edge. Moreover, LTE services can be established by employing the somewhat centralized control plane elements, distributed user plane elements and the IEG without affecting existing (e.g. UMTS) services.

Referring initially to FIG. 1, there illustrated are high-level system diagrams depicting example system architectures 100, 102 for EPC in accordance with an aspect of the subject disclosure. The systems 100, 102 can provide various advantages of EPC, such as, but not limited to, reduced latency and higher data performance through a flatter all-IP architecture and provides support for both LTE radio-access networks and interworking with 3G radio-access networks. Moreover, the systems 100, 102 can provide optimization for all services provided via IP.

FIG. 1A illustrates system 100 that can deploy a PDN-GW (Packet Data Network Gateway) 104 in a core 106, for example a central management center, such as, but not limited to a NDC (National Data Center) with S-GW (Serving Gateway) 108 deployed at an edge 110, such as but not limited to, a RDC (Regional Data Center). The deployment illustrated in FIG. 1A provides minimum impact on existing services (e.g. UMTS services) and is cost effective. In addition, since the S-GW 108 is deployed at the edge, backhaul from an eNodeB (not shown) is substantially reduced.

As shown in FIG. 1A, the main components of EPC, for example, as defined by the 3GPP standards, include a PDN-GW 104 and S-GW 108. Typically, the S-GW 108 can terminate the interface towards EUTRAN. For each UE (user equipment) associated with the EPS, at a given point of time, a single S-GW 108 can be employed. The S-GW 108 can be employed for routing and/or forwarding of user data packets and can operate as a local Mobility Anchor point for inter-eNodeB handover. Further, the S-GW 108 can perform 3GPP Anchor function that provides mobility anchoring for inter-3GPP mobility (terminating S4 and relaying the traffic between 2G/3G system and PDN-GW 104). For idle state UEs associated with the S-GW 108, the S-GW 108 can terminate a DL (downlink) data path and trigger paging when DL data arrives for the UE by utilizing downlink packet buffering and initiation of network triggered service request procedure. Furthermore, the S-GW 108 can manage and/or store UE contexts, e.g. parameters of the IP bearer service, network internal routing information. Additionally, the S-GW 108 can perform replication of the user traffic in case of lawful interception.

The PDN-GW 104 is the node that terminates the SGi interface towards the PDN. If a UE is accessing multiple PDNs, there can be more than one PDN GW for that UE. The PDN-GW provides connectivity to the UE to external packet data networks by being the point of exit and entry of traffic for the UE. In one aspect, the PDN-GW 104 can be employed as a mobility anchor for mobility between 3GPP access systems and non-3GPP access systems, such as but not limited to, such as WiMAX and 3GPP2 (CDMA 1X and EvDO). The PDN-GW 104 can perform policy enforcement, per-user based packet filtering (e.g. by deep packet inspection), charging support, lawful Interception, UE IP address allocation and/or packet screening. According to one embodiment, the PDN-GW 104 can be deployed in the core 106, such that, the connectivity and/or services between the UE and external packet data networks are managed within a central location.

FIG. 1B, illustrates an alternate network architecture 102 wherein both PDN-GW 104 and S-GW 108 can be deployed together at core 106 during initial deployment. By deploying the S-GW-108 at a central location, such as, the core 106 (as opposed to edge 110 in FIG. 1A), costs and complexity can be further reduced. However, a long backhaul from eNodeB (not shown) to S-GW 108 can be encountered. The deployment options illustrated in FIG. 1A and FIG. 1B can be modeled based on a cost and impact analysis and synch up with an SGSN team. It can be appreciated that architectures 100 and 102 can deploy components defined in the EPC standards along with currently employed components (not shown) by the 3G radio access networks such that existing services (e.g. 3G) are not affected.

Figure 2:
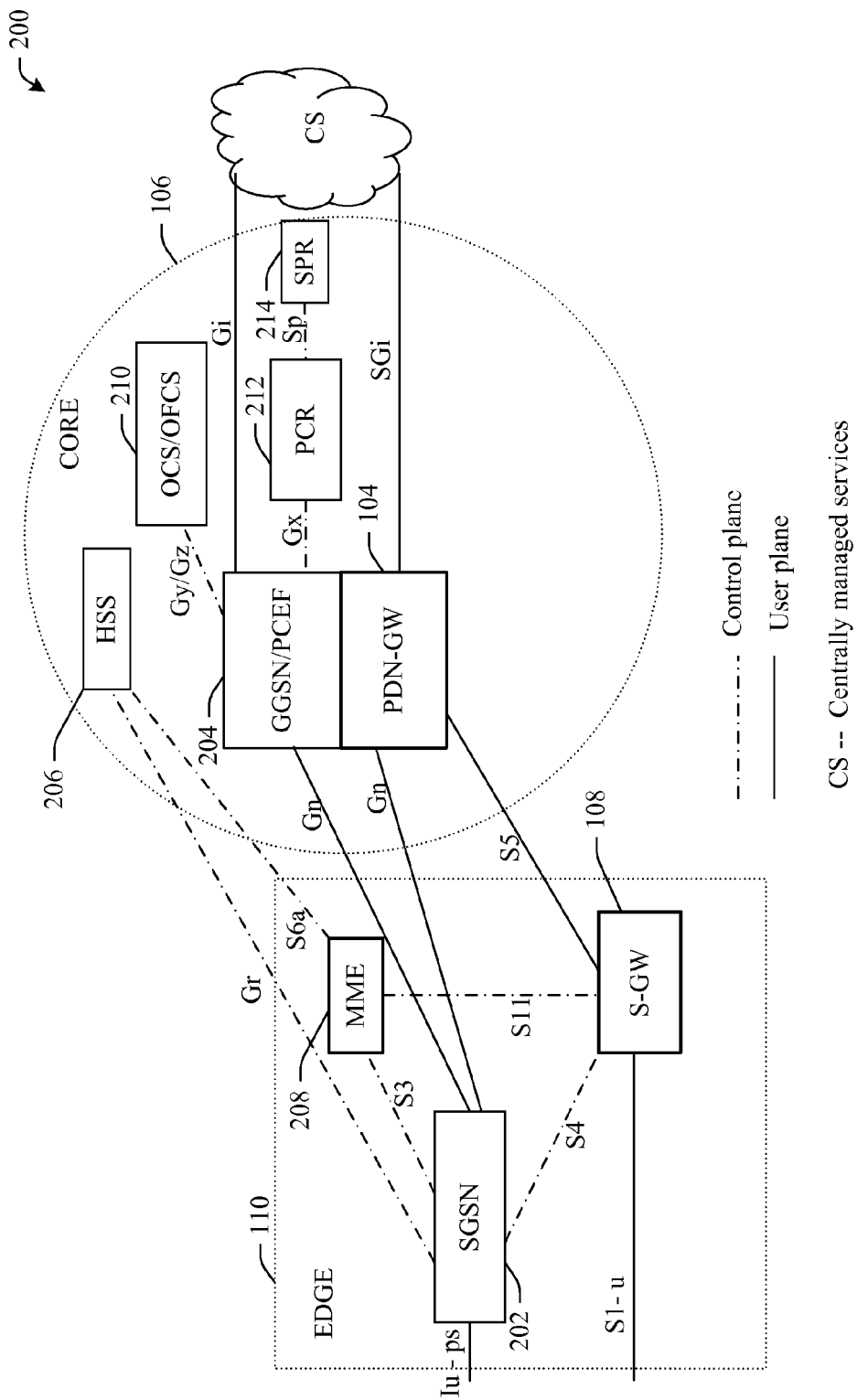
FIG. 2 illustrates an example network architecture for migration towards an EPS, in accordance with an aspect of the disclosure.

FIG. 2 illustrates an example network architecture for migration towards an EPS, in accordance with an aspect of the disclosure. System 200 can be employed to deploy EPS functionality without affecting 3G services and/or 3G architecture. The 3G architecture can be based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. Further, it can be appreciated that the S-GW 108 and PDN-GW 104 can include functionality, as more fully described herein, for example, with regard to systems 100, 102.

Typically, a UMTS network includes three interacting domains; a user equipment (UE) domain (not shown), a UMTS Terrestrial Radio Access Network (UTRAN) domain (not shown), and a core network (CN) domain, for example, 200. The UTRAN domain is also referred to as the access network domain and the CN is referred to as the core network domain, the both of which comprise an infrastructure domain. The Core Network can include packet-switched elements include a serving GPRS (General packet radio service) support node (SGSN) 202 and gateway GPRS support node (GGSN)/Policy and charging enforcement function (PCEF) 204. Some network elements such as an EIR (equipment identity register), HLR (home location register), VLR (visitor location register) and AuC (authentication center) (not shown) can also be utilized.

A function of the system 200 is to provide switching, routing and transit for user traffic. The system 200 also contains databases and network management functions. The system 200 has several interfaces that can be configured and dimensioned. An Iu-PS (packet-switched) reference point interfaces an RNC (radio network controller) (not shown) of the access network to the SGSN entity 202 for data from/to the SGSN 202. A Gn interface is provided between the SGSN 202 and the GGSN/PCEF 204. PCEF (Policy and charging enforcement function) is typically disposed in GGSN/PCEF 204 and can receive Policy and charging rules (PCR) 212 via the Gx interface. Further, Subscriber Policy Repository (SPR) 214 can be access via Sp interface. The GGSN/PCEF 204 can be coupled to an offline charging system (OFCS) and/or online charging system (OCS) 210, through Gz and Gy interfaces respectively. A Gi Interface can be located between the GGSN/PCEF 204 and an external PDN (Public Data Network). Further, the SGSN 202 can connect to an HSS (Home subscriber server) 206 via a Gr interface. The HSS 206 is a master user database that supports the network entities that actually handle calls and can contain subscription-related information (user profiles), perform authentication and authorization of a user, and provide information about the user's physical location.

In addition to the conventional UMTS network, system 200 can include EPS components, such as, an MME (Mobility management entity) 208, S-GW 108 and PDN-GW 104. According to an aspect, the MME 208 and S-GW 108 can be deployed at an edge, for example, regional data center 110 and the PDN-GW 104 can be deployed in the national data center 106. Typically, the MME 208 can manage mobility, UE (User Equipment) identities and security parameters. The MME 208 can be employed for idle mode UE tracking and paging procedure including retransmissions, bearer activation and/or deactivation process and can also be responsible for choosing the S-GW 108 for a UE at the initial attach and at time of intra-LTE handover involving Core Network (CN) node relocation. The MME 208 can interact with the HSS 206 by employing an S6a interface. Moreover, the S6a interface enables transfer of subscription and authentication data for authenticating and/or authorizing user access to the evolved system (AAA interface) between MME 208 and HSS 206.

The MME 208 can check the authorization of a UE and enforce UE roaming restrictions. Further, the MME 208 can be a termination point in the network 200 for ciphering/integrity protection for NAS (Non-Access Stratum) signaling and can facilitate security key management. Lawful interception of signaling can also be supported by the MME 208. According to an aspect, the MME 208 can provide control plane function for mobility between LTE and 2G/3G access networks with the S3 interface terminating at the MME 208 from the SGSN 202. Specifically, the S3 interface enables user and bearer information exchange for inter 3GPP access network mobility in idle and/or active state and is based on the GTP protocol and the Gn interface as defined between SGSNs.

According to yet another aspect, the MME 208 can connect to the S-GW 108 located at the edge 110 via S11 interface. The S-GW 108 can employ an S1-U interface that provides a per bearer user plane tunneling between the Evolved UTRAN (not shown) and S-GW 108. The S1-U interface can contain support for path switching during handover between eNodeBs and can be based on the GTP-U protocol that is also used for Iu user plane in the Rel-7 architecture. In one aspect, the S-GW 108 communicates with the PDN-GW 104 in the core 106 by utilizing an S5 interface that provides user plane tunneling and tunnel management for the PDN connectivity.

The SGSN 202 can interface with the PDN-GW 104 by employing a Gn interface. Further, the PDN-GW 104 employs a SGi interface to connect with a packet data network. In an example, the packet data network can be an operator external public or private packet data network or an intra operator packet data network, e.g. for provision of IMS services. The SGi interface corresponds to Gi and Wi interfaces and can support most any 3GPP or non-3GPP access. According to an aspect, the services controlled by the PDN-GW 104 and/or GGSN/PCEF 204 can be centrally managed by utilizing the deployment in FIG. 2. In one example, the system 200 can be deployed as an initial architecture during migration to a 3GPP standard architecture.

Figure 3:
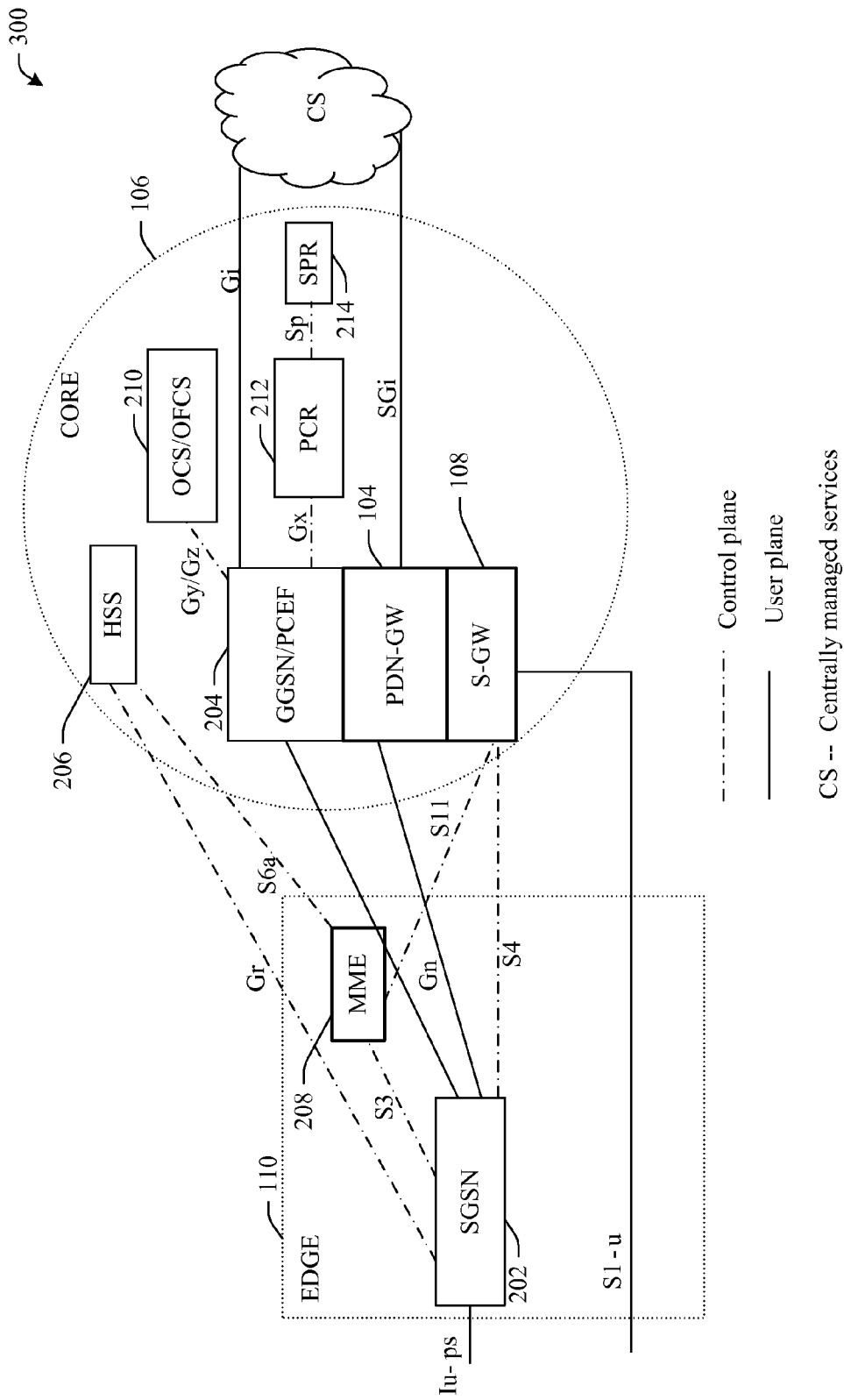
FIG. 3 illustrates an example system that depicts a co-existing architecture (none roaming) with a combined S-GW (serving gateway) and PDN-GW (packet data network gateway) at the core, according to an aspect of the subject specification.

Referring now to FIG. 3, there illustrated is an example system 300 that depicts a co-existing architecture (none roaming) with combined S-GW 108 and PDN-GW 104 at the core, according to an aspect of the subject specification. In particular, both PDN-GW 104 and S-GW 108 can be deployed together at the core 106, such that, a minimum impact is made on existing (e.g. UMTS) services. It can be appreciated that the S-GW 108, PDN-GW 104, SGSN 202, GGSN/PCEF 204, HSS 206, MME 208, OCS/OFCS 210, PCR 212, and SPR 214 can include functionality, as more fully described herein, for example, with regard to systems 100, 102 and 200.

According to an aspect, deploying the S-GW 108 along with the PDN-GW 104 at the core 106 can substantially reduce costs. The system 300 can support an existing 3G deployment model and can provide support for service continuity. Further, system 300 can leverage policy and charging control mechanisms efficiency and can provide for a smooth built up for LTE traffic and transition. However, since S-GW 108 and PDN-GW 104 are in the core 106, latency for real time services can increase. Additionally or alternately, local traffic routing cannot be supported at the edge 110 (e.g. RDC). It can be appreciated that the system 300 can be deployed as an initial architecture during migration to a 3GPP standard architecture.

Figure 4:
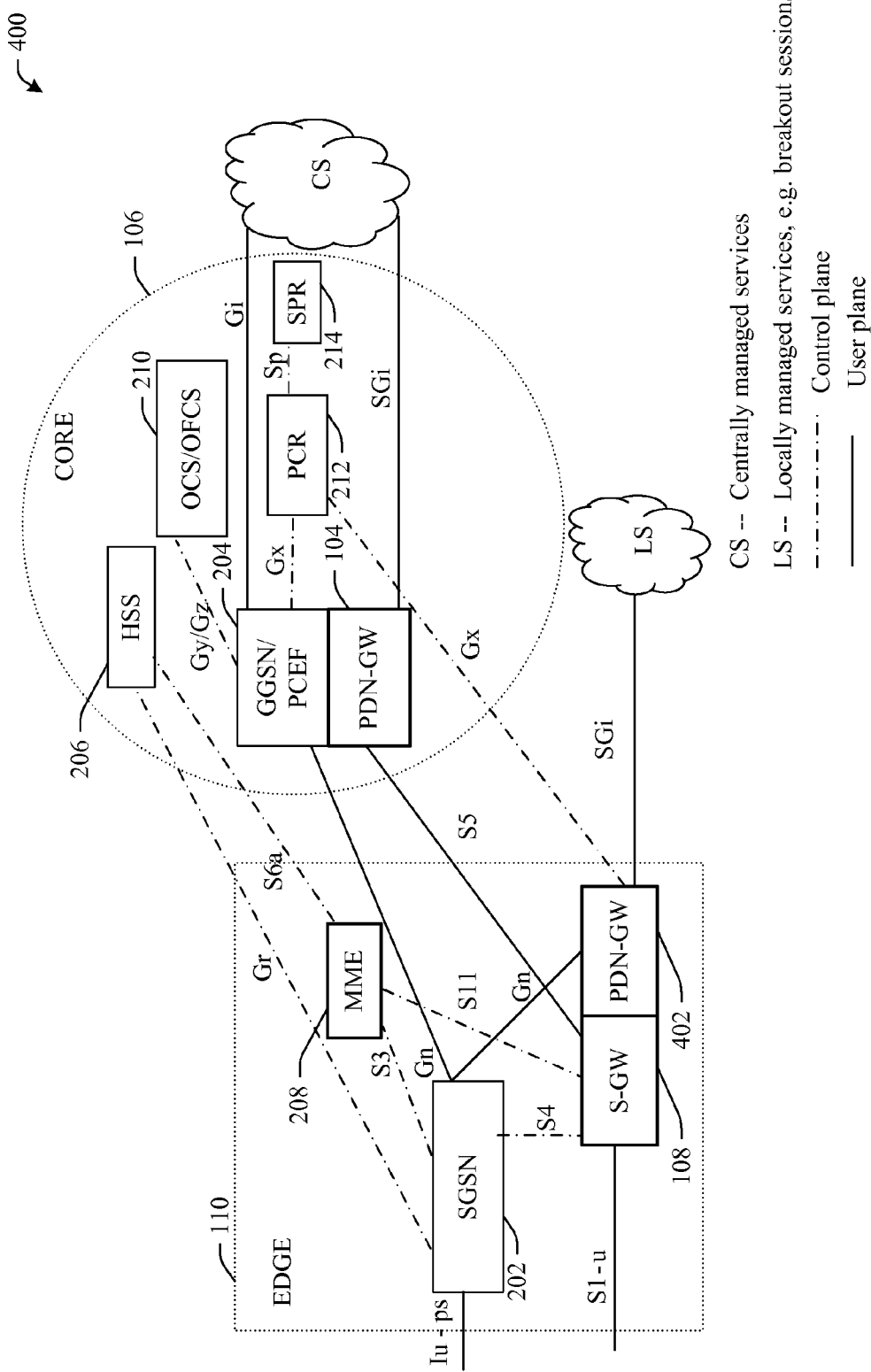
FIG. 4 illustrates an example hybrid architecture that can be employed for migrating to LTE/EPC standards, according to an aspect of the specification.

Referring now to FIG. 4, there illustrated is an example hybrid architecture that can be employed for migrating to LTE EPC standards, according to an aspect of the specification. It can be appreciated that the S-GW 108, PDN-GW 104, SGSN 202, GGSN/PCEF 204, HSS 206, MME 208, OCS/OFCS 210, PCR 212, and SPR 214 can include functionality, as more fully described herein, for example, with regard to systems 100, 102, 200 and 300. System 400 can be deployed as an intermediate architecture during migration to 3GPP architecture that can provide a flexible deployment based on mid-term business need and traffic projections.

According to an embodiment, system 400 deploys a PDN-GW 402 with S-GW 108 at the edge 110 (e.g. in RDC) and a PDN-GW 104 at the core 106 (e.g. NDC) in a hierarchical manner. It can be appreciated that the functionality of the edge PDN-GW 402 is substantially similar to the core PDN-GW 104 as described with respect to systems 100, 102, 200 and 300. The edge and core PDN-GW 402, 104 can enable a flexible deployment architecture that can support increasing LTE traffic. Moreover, simultaneous IP connections can be made to the multiple PDN-GWs (402, 104) offered by the EPC and LTE traffic can be increased. Depending on traffic projections and transition model, the split of local and centralized traffic can change over time. As an example, for data, the split can start with 80% central and 20% local (opposite for voice traffic).

The system 400 provides a shortened latency for real time traffic since the edge PDN-GW 402 can facilitate local management and/or routing of services. Further, according to an aspect, the edge PDN-GW 402 can provide optimized traffic routing at the edge and increased support for local breakout at the edge. The architecture depicted in FIG. 4 can provide flexible deployment, for example, can support overlay VoIP (Voice over IP) services. Furthermore, system 400 can provide flexible policy and charging support and default bearers at the edge PDN-GW 402.

In one aspect, the edge PDN-GW 402 can be connected to the SGSN 202 by a Gn interface and can employ a Gx interface to access the PCR 212. Moreover, services can create a data path from UE (to eNodeB) through regional S-GW 108, which is tunneled to PDN-GW 104 at core 106. Accordingly, existing services through SGSN 202 are not impacted and can be delivered as usual. Specifically, the PDN-GW 402 can facilitate optimal local routing of traffic and/or services at the edge, thus, reduce latency and improve performance. In one example, the deployment of system 400 can be flexible and can be scaled based on traffic. The additional PDN-GW 402 increases management complexity and/or costs, however can improve performance and reduce latency without affecting existing services. Further, the additional PDN-GW 402 can increase backhaul requirements and can employ intelligence to split traffics (e.g. edge policy functions).

Figure 5:
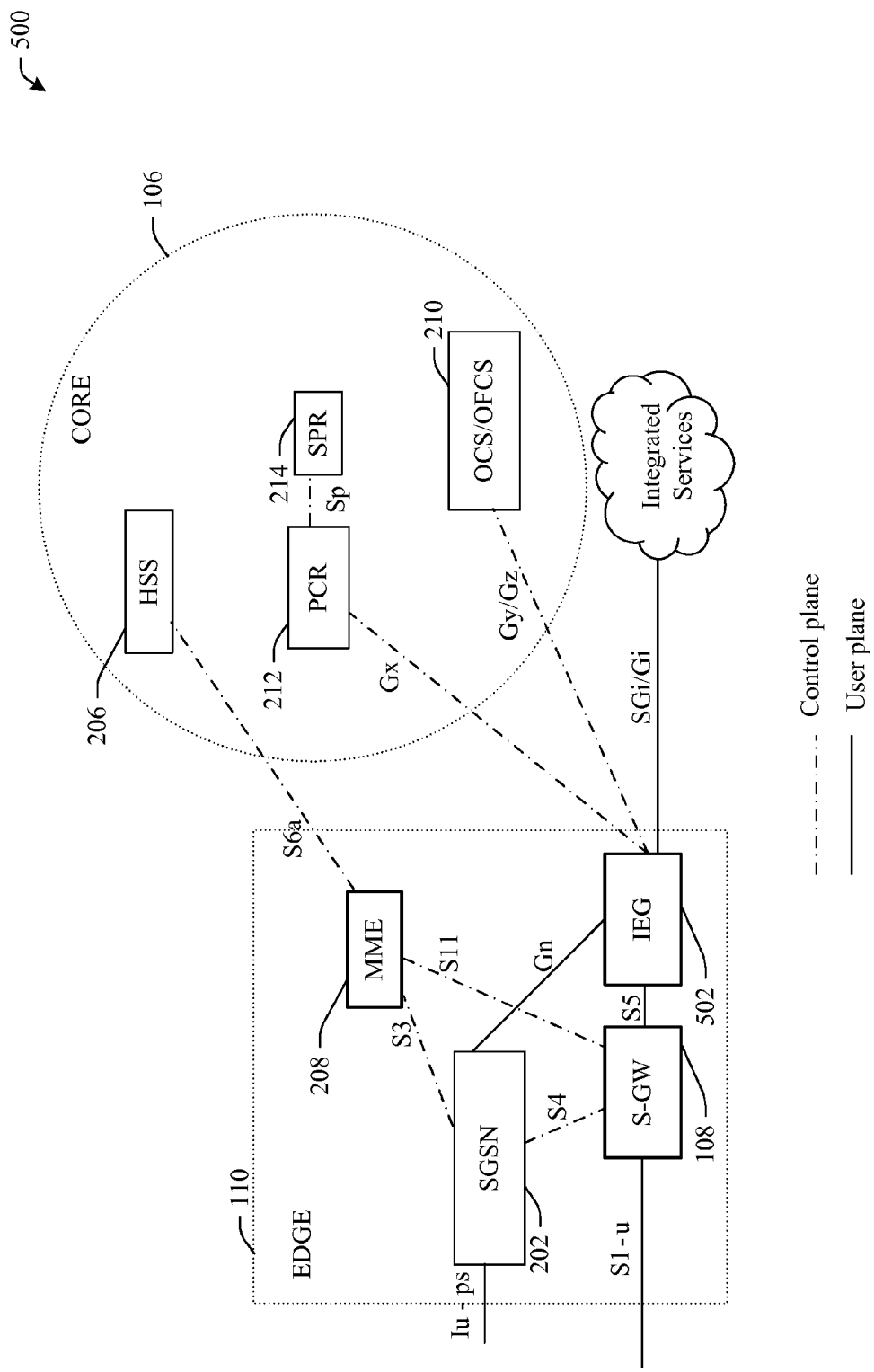
FIG. 5 illustrates an example long term evolution mobile core architecture that can meet the long term need of a converged network and that supports integrated telecommunication services in accordance with an aspect to the subject system.

FIG. 5 illustrates an example long term evolution mobile core architecture that can meet the long term need of a converged network that supports integrated telecommunication services in accordance with an aspect to the subject system. System 500 provides a distributed architecture that can facilitate routing of traffic and/or services at the edge. It can be appreciated that the S-GW 108, SGSN 202, HSS 206, MME 208, OCS/OFCS 210, PCR 212, and SPR 214 can include functionality, as more fully described herein, for example, with regard to systems 100, 102, 200, 300 and 400.

Typically, the EPS architecture, as defined by standards set by 3GPP, can include two nodes in the user plane, a base station and a core network gateway (GW). An MME 208 node that performs control-plane functionality can be employed and can be separated from a node that performs bearer-plane functionality (e.g. S-GW 108), with a well defined open interface between them (S11). Further, an S5 interface can be utilized can be to split the Gateway (GW) into two separate nodes (e.g. S-GW 108 and IEG 502) to enable independent scaling and growth of throughput traffic and control signal processing. According to an embodiment, system 500 employs a distributed architecture, such that, databases (e.g., HSS 206, PCR 212, SPR 214, etc.) are deployed in the core 106 and all gateways (e.g. SGSN 202, S-GW 108, IEG 502, etc) are deployed at edge 110.

System 500 can employ an intelligent edge gateway (IEG) 502 at the edge 110 (e.g. RDC) that can adhere to the 3GPP standards. Specifically, control plane elements can be centralized (e.g. at core 106) and user plane elements can be distributed at an edge 110. Additionally, user plane elements can be policy enabled and an integrated access gateway (e.g. IEG 502) can be utilized. According to an embodiment, the IEG 502 can interface with the SGSN 202 over a Gn interface. Further, the IEG 502 can access databases in the core 106 (e.g. NDC), such as, but not limited to, the PCR 212 via the Gx interface and can be coupled to the OFCS and/or OCS 210 at the core 106, through Gz and Gy interfaces respectively.

The IEG 502 can be composite edge gateway that is policy enabled and can be deployed in a very flexible fashion that can support a converged network architecture. In one aspect, the IEG 502 can intelligently route traffic at the edge, such that backhaul to the core 106 is avoided, latency is reduced and performance is improved. System 500 illustrates a truly distributed architecture that can be inline with long term 3GPP standardization wherein the IEG 502 can perform optimized routing at the edge 110. Moreover, system 500 can provide enhanced support for local breakout and can allow traffic to be kept local at the edge and thus provide shortened latency. Further, the distributed architecture of system 500 can separate signaling and user data path, with centralized signaling elements and distributed user path elements. Specifically, the system 500 supports existing data services (e.g. UMTS services) and does not have a negative affect the existing data services. In one example, the system 500 can support enhanced Femto cell 3GPP access to a home network (not shown). In one example, various AI (artificial intelligence)-based schemes can be employed for carrying out various aspects, for example, local traffic routing can be facilitated via an automatic classifier system and process. A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g. factoring into the analysis utilities and costs) to prognose or infer an action that a user desires to be automatically performed. A support vector machine (SVM) is an example of a classifier that can be employed. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g. via a generic training data) as well as implicitly trained (e.g. via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria routing of data traffic at the edge.

Figure 6:
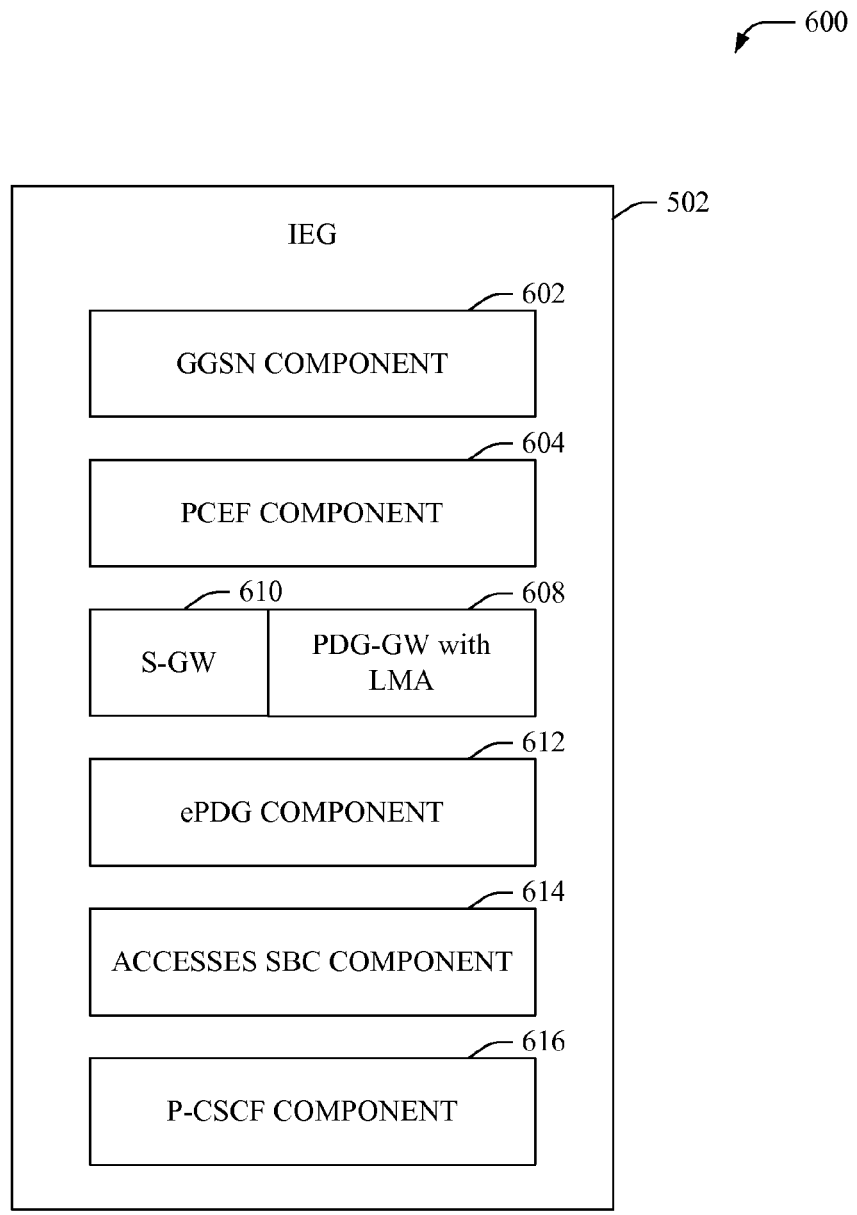
FIG. 6 illustrates an example high level system that depicts an intelligent edge gateway (IEG), according to an aspect of the subject disclosure.

Referring now to FIG. 6, there illustrated is an example high level system 600 that depicts an intelligent edge gateway IEG 502, according to an aspect of the subject disclosure. In one aspect, the IEG 502 can be an evolved data gateway that is a composite of edge functions that support mobility and distributed architecture (e.g. system 500), which can be supported in a converged network. Further, the IEG 502 can be policy enabled and can be deployed in a flexible fashion that can support a converged network architecture. The IEG 502 can facilitate intelligent routing of local traffic and thus reduce latency. In addition, the IEG 502 can be deployed at the edge and optimize routing at the edge and provide increased support for local breakout.

According to an aspect, the IEG 502 can be deployed at the edge (e.g. RDC) and can include a GGSN component 602 that can facilitate interworking between a GPRS network and the external packet switched network. As an example, the IEG 502 can employ the GGSN component 602 to route data from a packet switched network to the SGSN serving a mobile user, and route mobile-originated packets from the SGSN to the packet switched network. Additionally, the GGSN component 602 can keep a record of active mobile users and an SGSN that the mobile users are attached to, and can allocate IP addresses to mobile users. Further, GGSN component 602 can also facilitate billing. It can be appreciated that the GGSN component 602 can include functionality provided by a GGSN (2G/3G).

The IEG 502 can also include a PCEF component 604 that can handle most any PEP (Policy Enforcement Point) functions. Further, an S-GW 608 and a PDN-GW with LMA (local mobility anchor) 610 can also be included within the IEG 502. It can be appreciated that the S-GW 608 can be substantially similar to S-GW 108 in FIG. 4 and can include functionality thereof. Similarly, PDN-GW with LMA 610 can be substantially similar to PDN-GW 402 in FIG. 4 and include functionality thereof. Additionally, PDN-GW with LMA 610 can maintain a collection of host routes and associated forwarding information for mobile nodes within a localized mobility management domain under its control. Specifically, the PDN-GW with LMA 610 can employ a protocol to manage IP node mobility within the localized mobility management domain. Routing of mobile node data traffic can be anchored at the PDN-GW with LMA 610 as the mobile node moves around within the localized mobility management domain.

Additionally, an ePDG component 612 can also be included in the IEG 502. According to an aspect, the ePDG component 612 can include functionality of a PDG (packet data gateway) according to 3GPP TS 23.234 that specifies inter-working between 3GPP systems and WLAN. Moreover, ePDG component 612 can authenticate the users and control the traffic for untrusted network access. In particular, the ePDG component 612 can provide functionality to deliver voice and data services over the untrusted Internet and WiFi networks to femtocells and dual-mode handsets.

An Access SBC (session border controller) component 614 can be employed that provides with support for delivering real-time interactive IP-based voice, video and multimedia sessions in critical areas, such as, but not limited to, security, service reach maximization, SLA assurance, revenue and cost optimization, and regulatory compliance. The Access SBC component 614 can satisfy requirements at a border where subscribers access the IMS (IP Multimedia Subsystem) core. Further, a Proxy-Call Session Control Function (P-CSCF) component 616 can be utilized as a SIP (Session Initiation Protocol) signaling contact point, the outbound/inbound "proxy," for subscribers within IMS as defined by 3GPP. Typically, the P-CSCF component 616 can facilitate forwarding SIP registration messages from the subscriber's endpoint, the User Equipment (UE), in a visited network to the Interrogating-CSCF (I-CSCF) and subsequent call set-up requests and responses to the Serving-CSCF (S-CSCF). Further, the P-CSCF component 616 can maintain the mapping between logical subscriber SIP URI (uniform resource identifier) address and physical UE IP address and a security association, for both authentication and confidentiality, with the UE using IPsec for example. Furthermore, emergency call (E911) local routing within the visited network, accounting, session timers and admission control can also be supported by the P-CSCF component 616.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
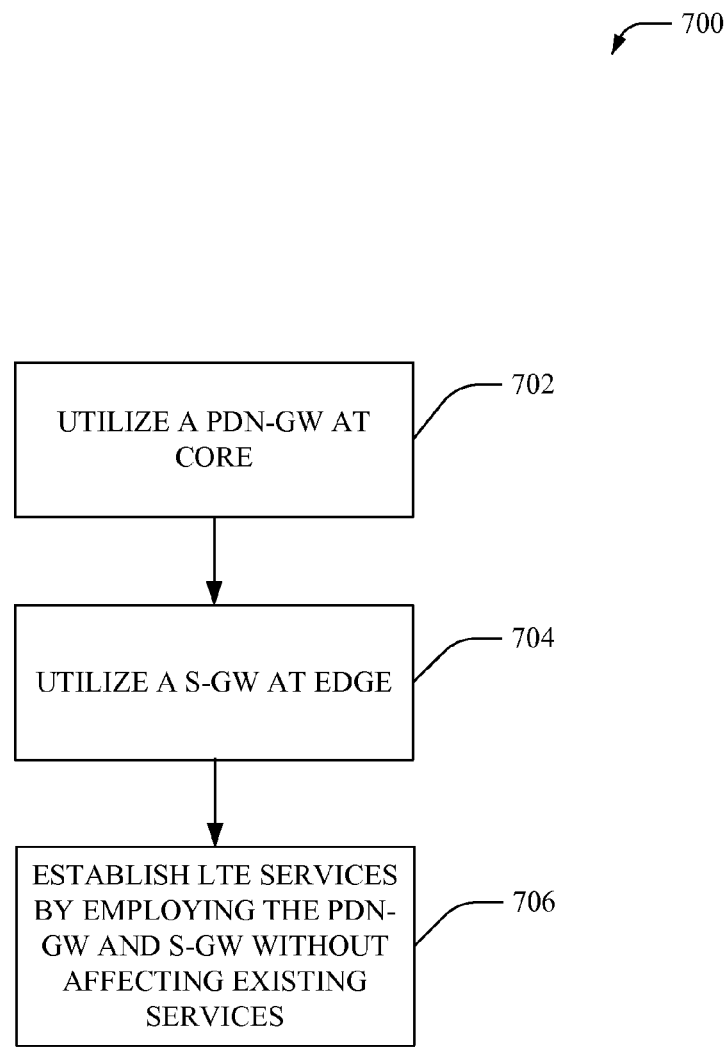
FIG. 7 illustrates an example methodology that facilitates migration towards a LTE/EPC with minimal impact on existing services in accordance with an aspect of the subject disclosure.

Referring now to FIG. 7, there illustrated is an example methodology 700 that facilitates migration towards a LTE/EPC with minimal impact on existing (2G/3G) services in accordance with an aspect of the subject disclosure. At 702, a PDN-GW can be utilized at the core, e.g. NDC and provide centralized management. At 704, an S-GW can be utilized at the edge, e.g. RDC and provide local management at the edge. Further, at 706, LTE services can be established by employing the PDN-GW and S-GW, without affecting the existing (e.g. UMTS) services.

Figure 8:
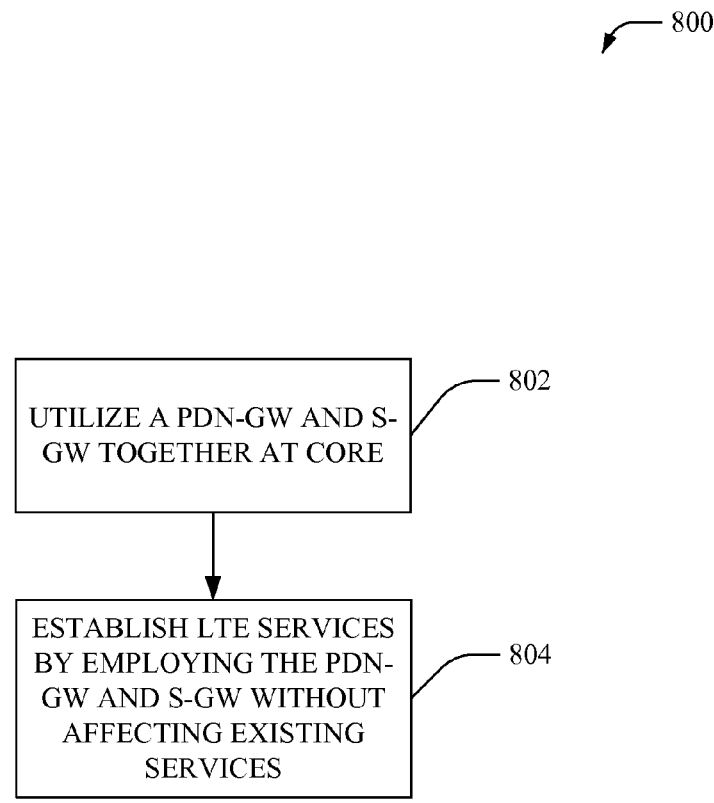
FIG. 8 illustrates an example methodology that can be employed at an initial phase to establish LTE services during migration to EPC, according to an aspect of the subject specification.

FIG. 8 illustrates an example methodology 800 that can be employed at an initial phase to establish LTE services during migration to EPC, according to an aspect of the subject specification. At 802, a PDN-GW and an S-GW can be utilized together at the core and can provide centralized management. At 804, LTE services can be established and/or delivered by employing the PDN-GW and S-GW, without affecting the existing (e.g. UMTS) services.

Figure 9:
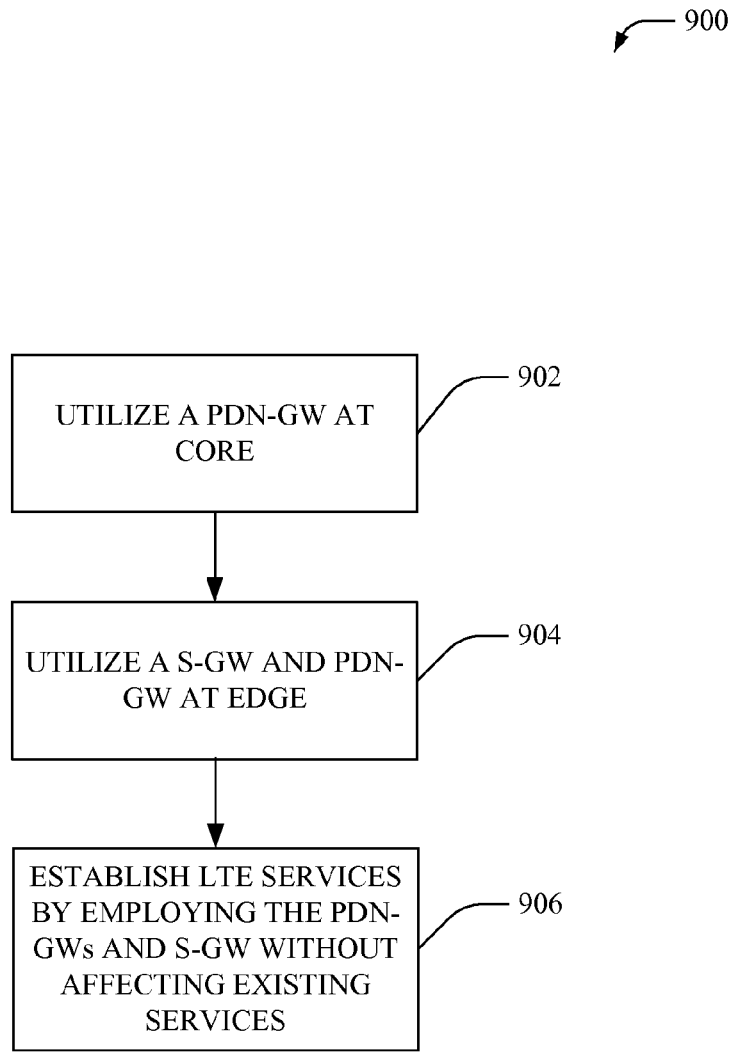
FIG. 9 illustrates an example methodology that can optimize routing at the edge and provide locally managed services, according to an aspect of the subject innovation.

FIG. 9 illustrates an example methodology 900 that can optimize routing at the edge and provide locally managed services, according to an aspect of the subject innovation. At 902, a PDN-GW can be utilized at the core, e.g. NDC, and provide centrally managed services. At 904, a PDN-GW and an S-GW can be utilized together at the edge, for example, RDC and can provide locally managed services. In one example, the core PDN-GW and edge PDN-GW can be utilized in a hierarchical manner. The edge PDN-GW can facilitate local traffic routing and minimize backhaul to the core. At 906, LTE services can be established and/or delivered by employing the PDN-GWs and S-GW, without affecting the existing (e.g. UMTS) services.

Figure 10:
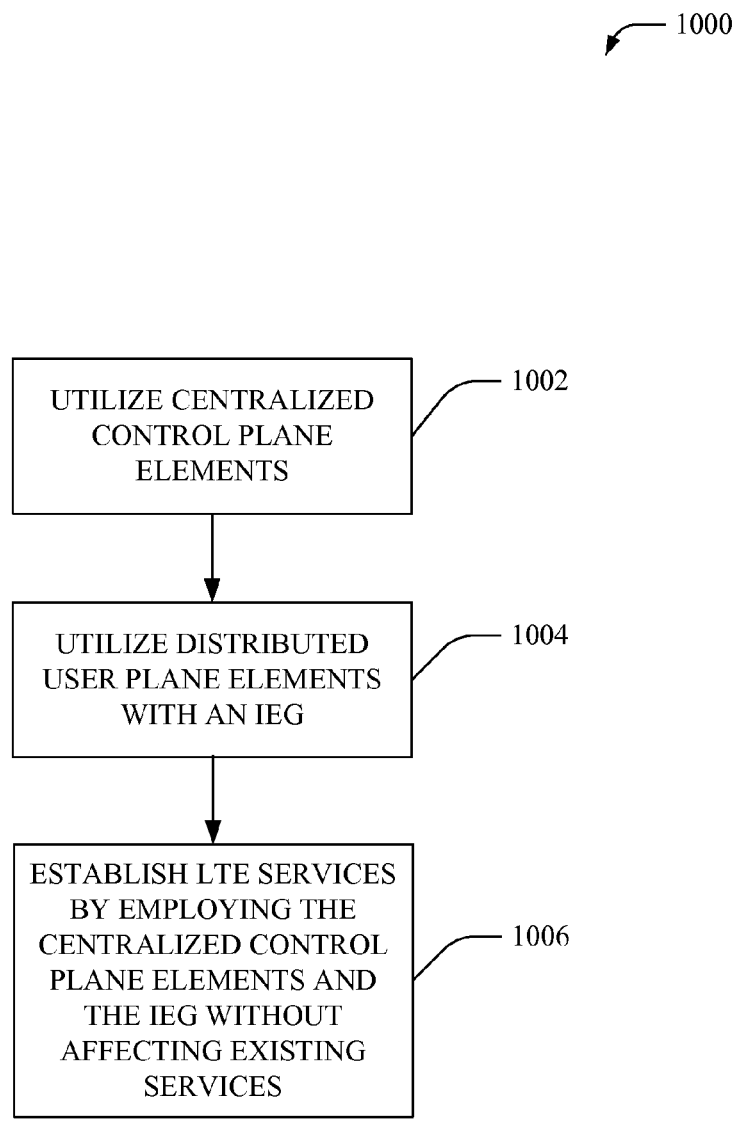
FIG. 10 illustrates an example methodology that facilitates separating signaling and user data path, such that, signaling elements are centralized and user path elements are distributed at the edge.

Referring to FIG. 10, there illustrated is an example methodology 1000 that facilitates separating signaling and user data path, such that, signaling elements are centralized and user path elements are distributed at the edge. At 1002, centralized control plane elements can be utilized, for example databases, such as, but not limited to HSS, PCR, OCS/OFCS, etc. At 1004, distributed user plane elements are utilized including an IEG. Moreover, the IEG is composite of edge functions, which can be supported in a converged network, that support mobility and distributed architecture. At 1006, LTE services can be established and/or delivered by employing the centralized control plane elements and the IEG without affecting existing (e.g. UMTS) services.

Figure 11:
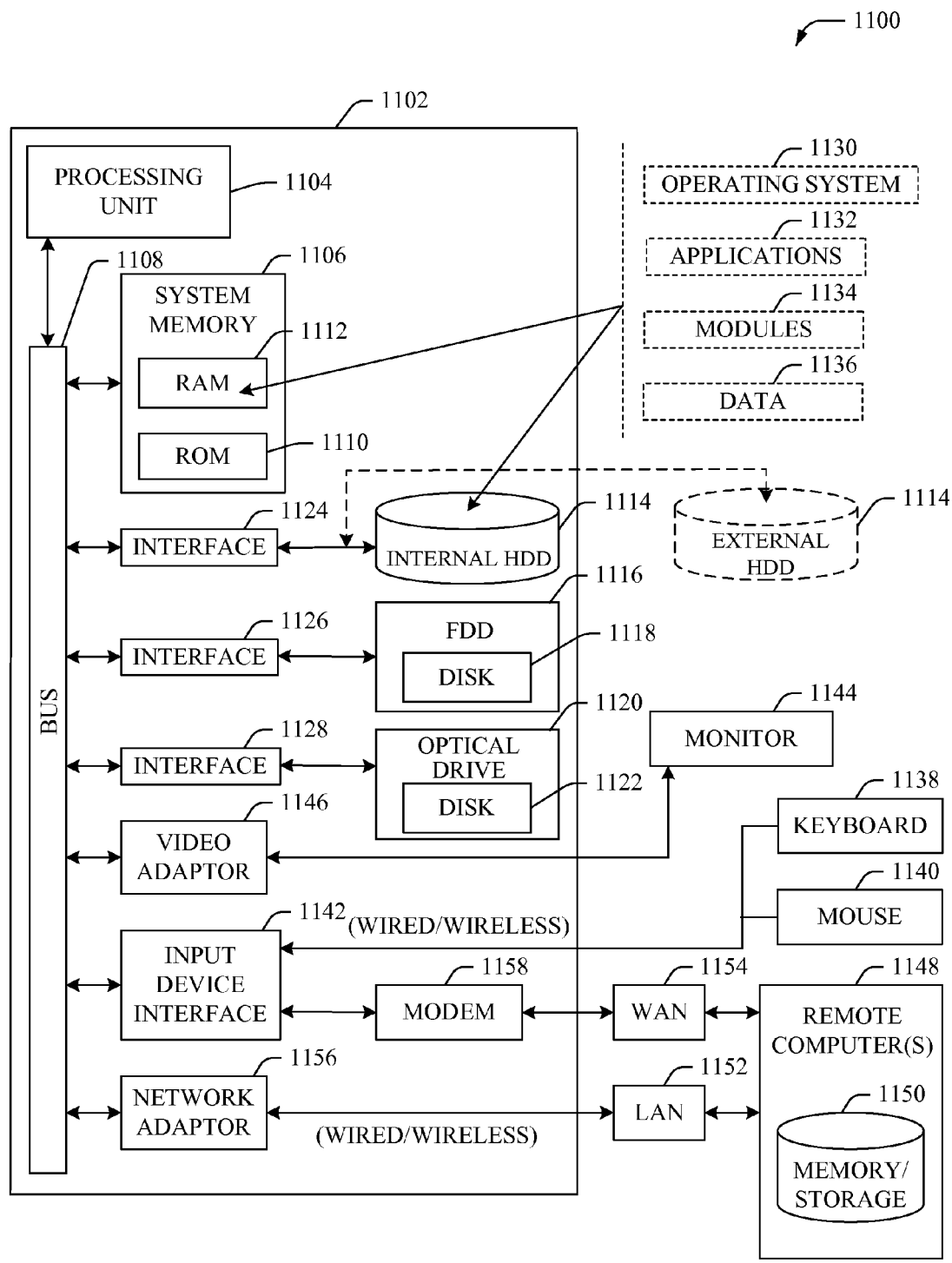
FIG. 11 illustrates a block diagram of a computer operable to execute the disclosed migration and/or long term evolution architectures.

Referring now to FIG. 11, there is illustrated a block diagram of a computer operable to execute the disclosed architectures. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, or advantages of the subject innovation described in the subject specification can be exploited in substantially any wireless communication technology. For instance, 4G, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store executable instructions; and
    a processor, coupled to the memory, that facilitates execution of the executable instructions to perform operations, comprising:
    based on time dependent traffic projection data, determining a first portion of data, received at a serving support node device of a first communication network in accordance with first percentage data, that is to be directed to a first packet data network gateway device, wherein the first packet data network gateway device is deployed at a parent node device of a hierarchically defined second communication network,
    based on the time dependent traffic projection data, determining a second portion of the data in accordance with second percentage data that is to be directed to a second packet data network gateway device that is deployed at a child node device of the hierarchically defined second communication network, and
    in response to determining that an expiration of a defined time period has occurred, updating the time dependent traffic projection data to adjust the second percentage data to facilitate an increase in the second portion of data.

2. The system of claim 1, wherein the operations further comprise:
    updating the time dependent traffic projection data to adjust the first percentage data to facilitate a decrease in the first portion of data.

3. The system of claim 1, wherein the updating comprises updating the time dependent traffic projection data to adjust the second percentage data based on information representing a traffic transition model.

4. The system of claim 1, wherein the second packet data network gateway device is employed to facilitate network load management.

5. The system of claim 1, wherein the serving support node device is a serving general packet radio service support node device and the operations further comprise:
    directing the second portion of the data from the serving general packet radio service support node device to the second packet data network gateway device via a Gn interface.

6. The system of claim 1, wherein the operations further comprise:
    receiving, via a Gx interface, policy and charging rule data from a network device that is deployed at the parent node device.

7. The system of claim 1, wherein the second portion of the data comprises information associated with a voice over Internet protocol service.

8. The system of claim 1, wherein the updating comprises updating the time dependent traffic projection data to adjust the second percentage data based on defined edge policy function data.

9. The system of claim 1, wherein the operations further comprise:

facilitating concurrent internet protocol connections to the first packet data network gateway device and the second packet data network gateway device to increase network throughput.

10. The system of claim 1, wherein the first portion of the data is associated with a service that is determined to satisfy a high latency criterion.

11. A method, comprising:
receiving, by a serving support node device of a first communication network and comprising a processor, information from a set of user equipment;
based on time-dependent traffic projection data, selecting, by the serving support node device in accordance with first percentage data, a first portion of the information that is to be directed to a first packet data network gateway device deployed at a parent node device of a hierarchically defined second communication network and, based on time-dependent traffic projection data, selecting, by the serving support node device, a second portion of the information in accordance with second percentage data that is to be directed to a second packet data network gateway device that is deployed at a child node device of the hierarchically defined second communication network; and
in response to determining that a defined time period has expired, updating, by the serving support node device, the time-dependent traffic projection data to increase an amount of the information that is transmitted to the second packet data network gateway device.

12. The method of claim 11, wherein the updating comprises updating the time-dependent traffic projection data based on defined traffic transition model data.

13. The method of claim 11, wherein the amount is a first amount and the method further comprises:
updating, by the serving support node device, the time-dependent traffic projection data to decrease a second amount of the information that is transmitted to the first packet data network gateway device.

14. The method of claim 11, further comprising:
receiving, by the serving support node device, authentication data from a subscriber data store that is deployed at the parent node device, wherein the authentication data is employed to facilitate the routing of the second portion of the information.

15. The method of claim 11, wherein the updating comprises updating the time-dependent traffic projection data based on operator-defined policy data.

16. A computer readable storage device comprising executable instructions that, in response to execution, cause a system comprising a processor to perform operations, comprising:
based on time-dependent traffic projection data, selecting a first portion of data, in accordance with a first fractional value, that is received at a serving support node device of a first communication network, wherein the first portion of data is to be directed to a first packet data network gateway device deployed at a parent node device of a hierarchically defined second communication network;
based on the time-dependent traffic projection data, selecting a second portion of the data, in accordance with a second fractional value, that is to be directed to a second packet data network gateway device deployed at a child node device of the hierarchically defined second communication network; and
in response to a determination that a defined time interval has expired, increasing the time-dependent traffic projection data to modify the second fractional value to facilitate an increase in an amount of the data that is to be directed to the second packet data network gateway device.

17. The computer readable storage device of claim 16, wherein the increasing comprises increasing the time-dependent traffic projection data to modify the second fractional value based on defined policy data.

18. The computer readable storage device of claim 16, wherein the increasing comprises increasing the time-dependent traffic projection data to modify the second fractional value based on defined traffic transition model data.

19. The computer readable storage device of claim 16, wherein the operations further comprise:
facilitating a transmission of control data associated with the second portion of the data to a data store deployed at the parent node device.

20. The computer readable storage device of claim 16, wherein the first fractional value and the second fractional value are determined based on type data representing a type of service associated with the data that is received at the serving support node device.

* * * * *